United States Patent
Shang et al.

(10) Patent No.: US 11,704,230 B2
(45) Date of Patent: Jul. 18, 2023

(54) TEST SCRIPT GENERATION BASED ON EVENT DATA AND VIDEO FRAMES

(71) Applicants: MICRO FOCUS LLC, Santa Clara, CA (US); Er-Xin Shang, Shanghai (CN); Bin Zhou, Shanghai (CN); Chao Lin Jiang, Shanghai (CN)

(72) Inventors: Er-Xin Shang, Shanghai (CN); Bin Zhou, Shanghai (CN); Chao Lin Jiang, Shanghai (CN)

(73) Assignee: Micro Focus LLC, Santa Clara, CA (US)

(*) Notice: Subject to any disclaimer, the term of this patent is extended or adjusted under 35 U.S.C. 154(b) by 0 days.

(21) Appl. No.: 17/420,337

(22) PCT Filed: Jan. 11, 2019

(86) PCT No.: PCT/CN2019/071377
§ 371 (c)(1),
(2) Date: Jul. 1, 2021

(87) PCT Pub. No.: WO2020/143030
PCT Pub. Date: Jul. 16, 2020

(65) Prior Publication Data
US 2022/0083458 A1    Mar. 17, 2022

(51) Int. Cl.
*G06F 9/44*       (2018.01)
*G06F 11/36*    (2006.01)
(Continued)

(52) U.S. Cl.
CPC ...... *G06F 11/3684* (2013.01); *G06F 11/3672* (2013.01); *G06V 10/25* (2022.01); *G06V 20/44* (2022.01); *G06V 40/28* (2022.01)

(58) Field of Classification Search
None
See application file for complete search history.

(56) References Cited

U.S. PATENT DOCUMENTS 8,856,594 B2 * 10/2014 Kurapati ............. G06F 11/3672
714/27
9,248,374 B2    2/2016 Watson et al.
(Continued)

FOREIGN PATENT DOCUMENTS

| CN | 104956326 A | 9/2015 |
| CN | 105204992 A | 12/2015 |

OTHER PUBLICATIONS

"Creating test case using Record & Playback," Katalon LLC, 2018, 21 pages [retrieved online from: www.katalon.com/resources-center/tutorials/web/writing-test-cases-web].
(Continued)

*Primary Examiner* — Wei Y Zhen
*Assistant Examiner* — Lanny N Ung
(74) *Attorney, Agent, or Firm* — Sheridan Ross P.C.

(57) ABSTRACT

In some examples, a system processes event data and video frames produced by a program during execution of the program, the event data representing user actions with respect to a graphical user interface (GUI) of the program. The system identifies an area of the GUI that corresponds to a respective user action of the user actions, wherein identifying the area of the GUI uses a first video frame before an event corresponding to the respective user action, and a second video frame after the event corresponding to the respective user action. The system identifies, based on the identified area, a test object representing a user interface (UI) element, and generates a test script for testing the program, the test script including the test object.

20 Claims, 5 Drawing Sheets

(51) Int. Cl.
*G06V 10/25* (2022.01)
*G06V 20/40* (2022.01)
*G06V 40/20* (2022.01)

(56) References Cited

U.S. PATENT DOCUMENTS

| | | |
|---|---|---|
| 10,019,346 B2 | 7/2018 | Luan |
| 10,026,092 B2 | 7/2018 | Heater et al. |
| 2013/0007522 A1 | 1/2013 | Kurapati |
| 2013/0263090 A1 | 10/2013 | Polk et al. |
| 2014/0047417 A1* | 2/2014 | Kaasila ............... G06F 11/3664 |
| | | 717/135 |
| 2015/0242104 A1* | 8/2015 | Stokman .............. G11B 27/031 |
| | | 707/706 |
| 2015/0363300 A1* | 12/2015 | Luan ................... G06F 11/3684 |
| | | 714/38.1 |
| 2017/0147480 A1* | 5/2017 | Lachwani ........... G06F 11/3664 |
| 2018/0173614 A1 | 6/2018 | Gong et al. |
| 2021/0294728 A1* | 9/2021 | Janarthanan ........ G06F 11/3684 |

OTHER PUBLICATIONS

AnkaLua "[Open Source] Android game automation by snap and play (No root.)," xda-developers, Sep. 9, 2017, 7 pages [retrieved online from: forum.xda-developers.com/android/development/source-android-game-automation-snap-t3670423].

Tuovinen "Mobile Game Test Automation with Image Recognition," University of OULU, Feb. 2018, Master's Thesis for Degree Programme in Computer Science and Engineering 51 pages.

International Search Report and Written Opinion prepared by the ISA/CN dated Apr. 18, 2019, for International Application No. PCT/CN2019/071377.

\* cited by examiner

TEST SCRIPT GENERATION BASED ON EVENT DATA AND VIDEO FRAMES

CROSS-REFERENCE TO RELATED APPLICATIONS

This application is a national stage application under 35 U.S.C. 371 and claims the benefit of PCT Application No. PCT/CN2019/071377 having an international filing date of 11 Jan. 2019, which designated the United States, the entire contents of which are incorporated herein by reference.

BACKGROUND

Program testing is performed to verify that a program is functionally according to target specifications or without errors. A program can refer to software, firmware, or other types of machine-readable instructions. Bugs in a program can cause issues that lead to abnormal behavior of the program.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Program testing involves detecting issues in a program that cause the program to behave abnormally. A program includes machine-readable instructions, such as those of software and/or firmware. Based on the testing, the program can be debugged to eliminate the issues. In some cases, program testing can be performed manually, with a user interacting with the program while the program executes. For example, the user can make user input selections in a graphical user interface (GUI) of the program during execution of the program. Once issues are detected based on interactions between the user and the program, quality assurance personnel may attempt to recreate the issues during a debugging process. In a manual debugging process, the quality assurance personnel identifies user actions that led to the discovery of an issue, and repeats the user actions to recreate the issue. In an automated debugging process, a test script can be generated (e.g., manually by the quality assurance personnel), and a user simulation program can execute the test script to simulate the user actions that previously led to discovery of an issue in an attempt to recreate the issue. In either case, if any of the user actions is missed, the issue may not be recreated, which prevents successful debugging of the program.

In some examples, a video recording can be made of a user interacting with a program's GUI that led to an issue. Quality assurance personnel can then watch the video recording to note the user actions, for the purpose of writing a test script that when executed recreates the user actions. In other examples, a test script can be automatically generated based on the video recording.

Manual generation of a test script by a human based on a previous recording of user actions that led to detection of program issues can be slow, labor intensive, and error prone. Even in examples where a test script can be automatically generated based on a video recording, such example processes are not real-time processes, since the video recording of user actions has to be first made, and the video recording is then later processed to determine the user actions that were made.

In accordance with some implementations of the present disclosure, real-time processing of user input event data and video frames relating to execution of a program (software, firmware, or other machine-readable instructions) under test can be performed for the purpose of generating a test script that specifies user actions performed that led to the program issues. Real-time processing refers to processing of the user input event data and the video frames during use of a program under test by a user, such that the test script is generated as the user input event data and the video frames are generated during the use of the program under test.

A system processes event data and video frames produced by a program during execution of the program. The event data represents user actions with respect to a graphical user interface (GUI) (which can include a GUI screen or multiple GUI screens) of the program. The event data includes timestamps associated with events represented by the event data. The video frames also are associated with timestamps (as part of metadata associated with the video frames). The timestamps of the event data and the timestamps associated with the video frames can be used to correlate events represented by the event data with the video frames.

The system identifies an area of the GUI that corresponds to a respective user action of the user actions. The identifying of the area of the GUI uses a set of first video frames (where a "set" of video frames can include just a single video frame or multiple video frames)) before an event corresponding to the respective user action, and a set of second video frames after the event corresponding to the respective user action. The system identifies, based on the identified area, a test object representing a user interface (UI) element, generates a test script for testing the program, the test script including the test object.

Figure 1:
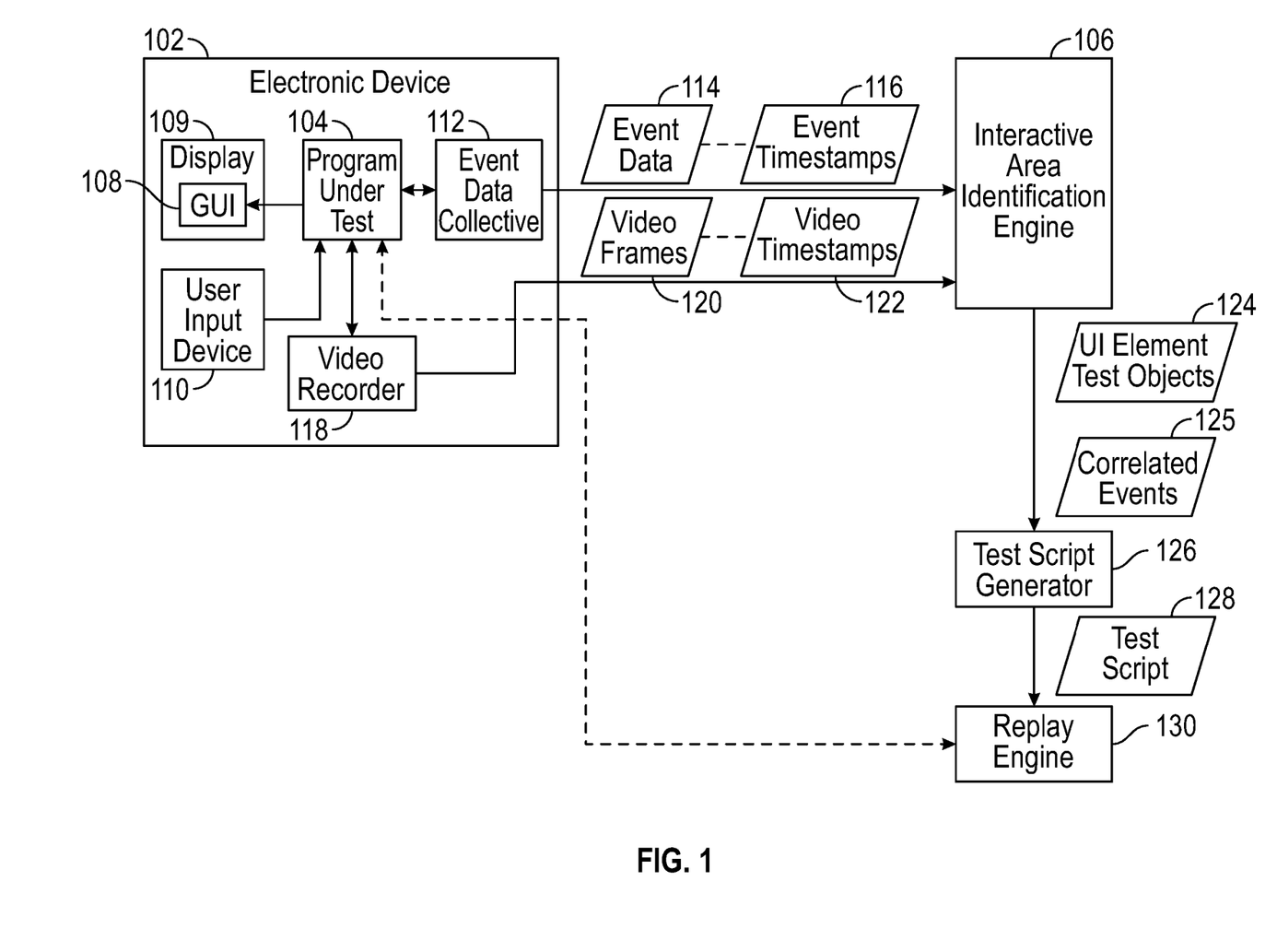
FIG. 1 is a block diagram of an arrangement according to some examples.

FIG. 1 is a block diagram of an example arrangement that includes an electronic device 102 in which a program under test 104 is executed. Examples of the program 104 can include any of the following: a web browser, a game application, a three-dimensional (3D) simulation application, and so forth.

The arrangement includes an interactive area identification engine 106 for identifying interactive areas in a GUI 108 presented by the program under test 104 during execution of the program under test 104. The GUI 108 is displayed by a display device 109 that is part of or coupled to the electronic device 102.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The electronic device 102 includes a user input device 110, which can be used by a user at the electronic device 102 to make selections of UI elements in the GUI 108 presented by the program under test 104. Examples of the user input device 110 can include any or some combination of the following: a mouse device, a keyboard, a touchscreen, a touchpad, and so forth.

The electronic device includes an event data collector 112 to record events corresponding to user actions made with respect to the GUI 108, such as with the user input device 110. The event data collector 112 can be implemented using machine-readable instructions executable in the electronic device 102, or as a hardware processing circuit.

The event data collector 112 outputs event data 114, which can include or be associated with event timestamps 116. In some examples, the event timestamps 116 are part of the event data, while in other examples, the event timestamps 116 can include metadata separate from but associated with the event data 114. The event timestamps 116 indicate times at which events corresponding to user actions occurred.

The electronic device 102 further includes a video recorder 118, which can record video frames of the GUI 108 as a user interacts with the GUI 108. The video recorder 118 can be implemented using machine-readable instructions executable in the electronic device 102, or as a hardware processing circuit.

Video frames can refer to a continual sequence of image frames. The video recorder 118 outputs video frames 120, along with metadata including video timestamps 122 that indicate times at which respective video frames were acquired. In some examples, the video timestamps 122 are part of the video frames 120, while in other examples, the video timestamps 122 can include metadata separate from but associated with the video frames 120.

The event data 114, event timestamps 116, video frames 120, and video timestamps 122 are transmitted over a network or other link, and received by the interactive area identification engine 106.

The interactive area identification engine 106 is able to identify interactive areas in the GUI 108 based on the event data 114, event timestamps 116, video frames 120, and video timestamps 122. The interaction areas identified by the interactive area identification engine 106 correspond to UI elements of the GUI 108 that can be selected by a user. Examples of UI elements include any or some combination of the following: text boxes or text fields, control buttons, menus, pop-up dialog boxes, and so forth.

The interactive area identification engine 106 outputs UI element test objects 124, which represent respective UI elements identified by the interactive area identification engine 106. The UI element test objects 124 are provided to a test script generator 126, which produces a test script 128 for testing the program under test 104. The test script generator 126 can include a hardware processing circuit or a combination of a hardware processing circuit and machine-readable instructions.

The test script 128 includes program code. The test script includes UI test objects that represent respective UI elements of the GUI 108, along with representations of user actions that are to be performed on UI elements represented by the UI element test objects 124. The information relating to the user actions to be performed on the UI elements are derived from the event data 114. Note that because event timestamps 116 and video timestamps 122 are associated with respective events and video frames that include images of UI elements, the interactive area identification engine 106 can correlate, based on the timestamps, events corresponding to user actions with respective UI elements identified by the interactive area identification engine 106. Information of the correlated events 125 is also provided by the interactive area identification engine 106 to the test script generator 126, which uses the information of the correlated events 125 along with the UI element test objects 124 to build the test script 128.

The test script 128 can include information regarding a collection (e.g., a sequence) of user actions to be performed on respective UI elements of the GUI 108. These user actions perform with respect to corresponding UI elements can include the collection of user actions that led to a detected issue (or multiple detected issues) of the program under test 104.

The test script 128 is provided to a replay engine 130, which can include a simulation program that executes the test script 128. In some examples, the test script 128 can include a compiled code that can be executed by the replay engine 130. In other examples, test script 128 can include interpreted code that can be interpreted and executed by the replay engine 130. Executing the test script 128 by the replay engine 130 recreates (simulates) user actions described in the test script 128, which are applied to the program under test 104 in an effort to debug issues associated with the program under test 104.

Although FIG. 1 shows the interactive area identification engine 106, the test script generator 126, and the replay engine 130 as being outside of the electronic device 102, it is noted that in further examples, any or some combination of the interactive area identification engine 106, the test script generator 126, and the replay engine 130 can be part of the electronic device 102.

Figure 2A:
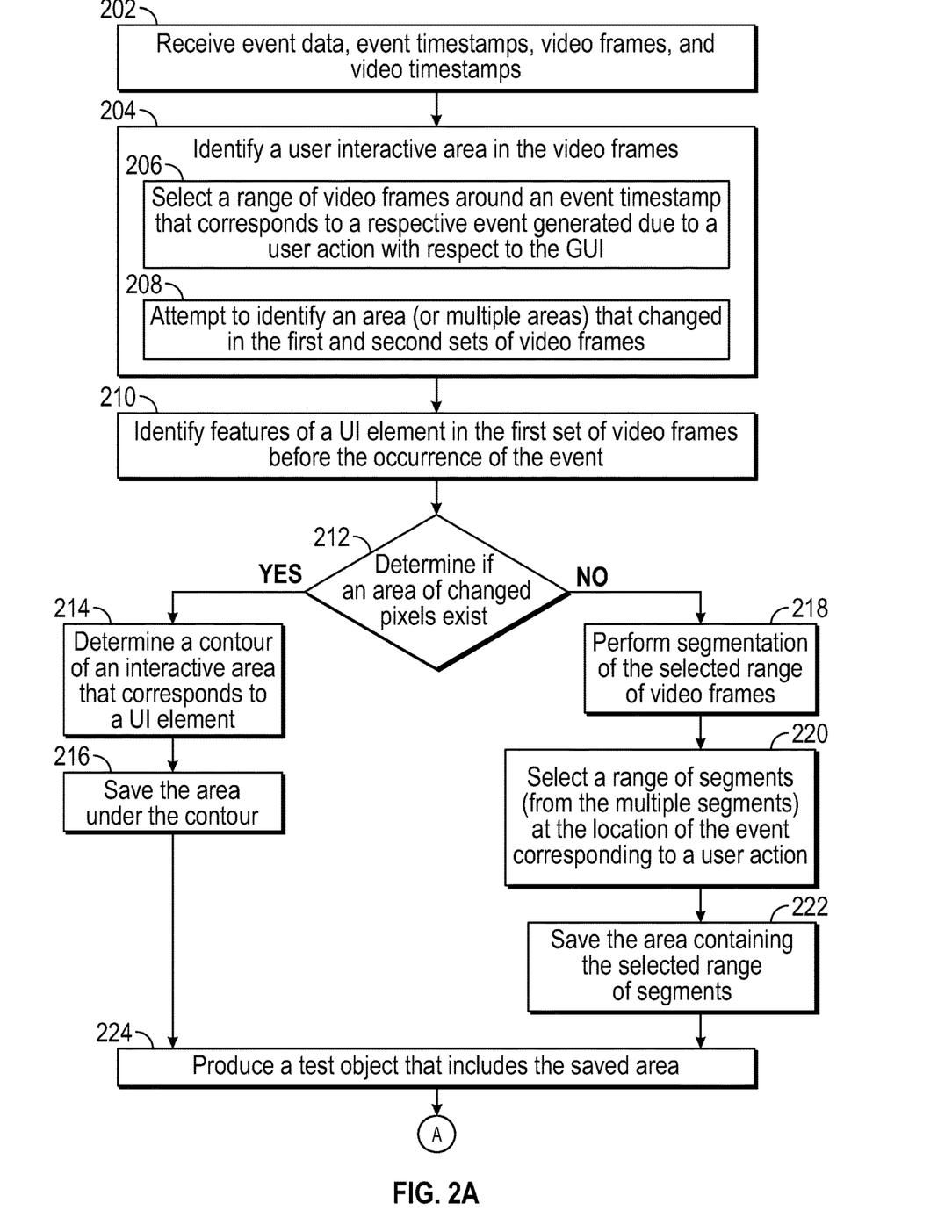
FIGS. 2A-2B depict a flow diagram of a process according to some examples
Figure 2B:
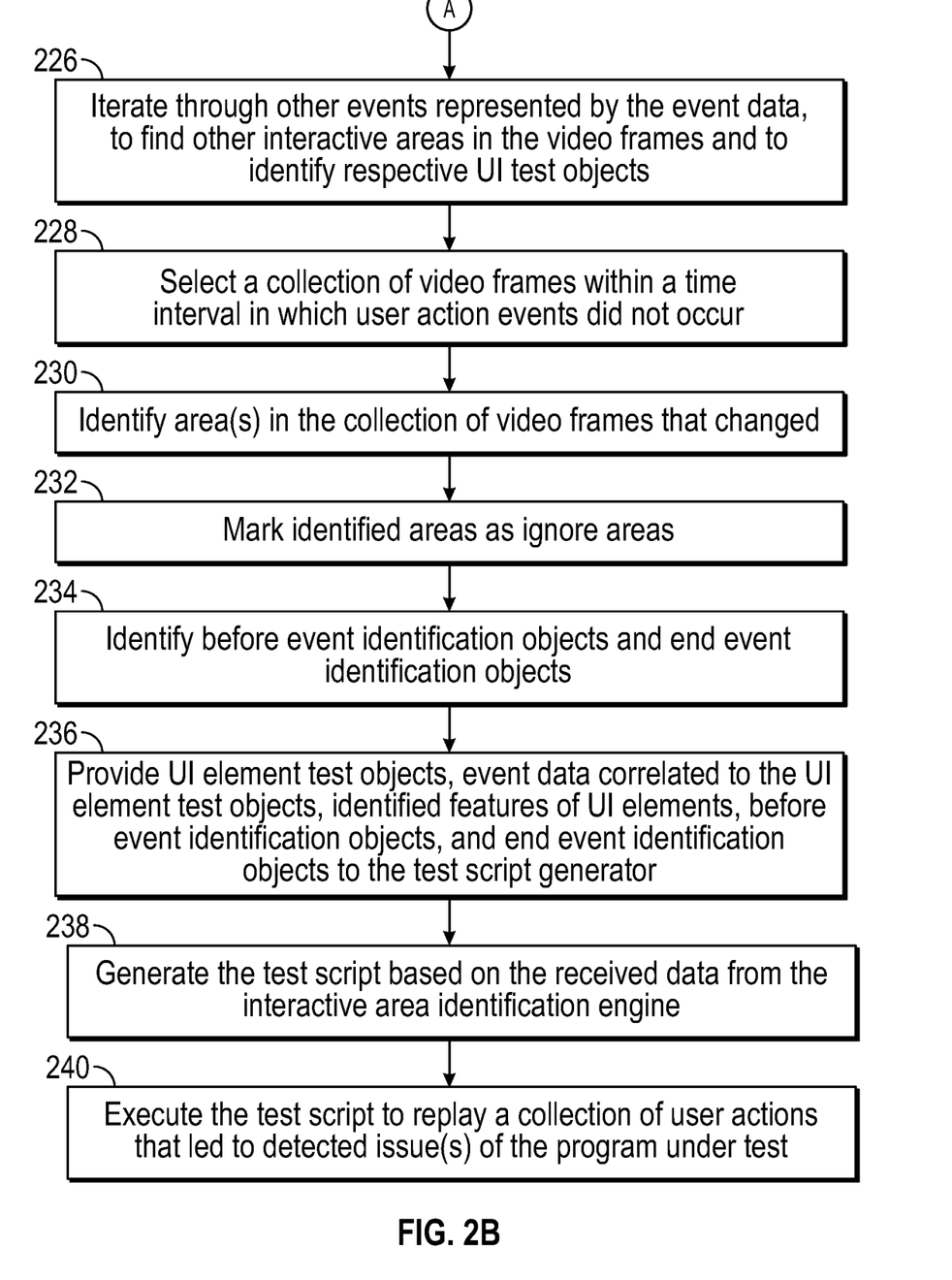

FIGS. 2A-2B depict a flow diagram of a process that can be performed by various components depicted in FIG. 1, in some examples. Although FIGS. 2A-2B show a flow of tasks in a given order, it is noted that the tasks can be performed in a different order in other examples, or alternatively, some of the tasks can be omitted or replaced with other tasks.

The interactive area identification engine 106 receives (at 202) the event data 114, the event timestamps 116, the video frames 120, and the video timestamps 122. The events represented by the event data 114 and the video frames 120 can be combined based on the event timestamps 116 and the video timestamps 122.

The interactive area identification engine 106 identifies (at 204) a user interactive area in the video frames 120. The identification of a user interactive area includes selecting (at 206) a range of video frames 120 around an event timestamp that corresponds to a respective event generated due to a user action with respect to the GUI 108. The selected range of video frames can be separated into a first set of video frames before the event timestamp, and a second set of video frames after the event timestamp. Each set of video frames can include a single video frame, or alternatively, multiple video frames.

The interactive area identification engine 106 attempts to identify (at 208) an area (or multiple areas) that changed in the first and second sets of video frames. In other words, the interactive area identification engine 106 seeks to identify a given area in the selected range of frames that has a first state (a first groups of pixels with first values in the given area) in the first set of video frames before the event timestamp, and a different second state (a second group of pixels having different values in the given area) in the second set of video frames after the event timestamp. The given area that changed from a first state before the event to a different second state after the event is likely a user interactive area that was changed due to a user action (a user input, a user click, a user key press, a user touch, etc.) made in GUI 108.

The interactive area identification engine 106 identifies (at 210) features of a UI element in the first set of video frames before the occurrence of the event. Examples of such features include corners of a text box, circles of UI elements, and so forth. The identified features are saved, and will be used during later replay of the test script 128 by the replay engine 130. The features of the first set of video frames prior to the event represent structures of a UI element prior to any change of the UI element due to user action corresponding to the event.

In some examples, the identification of features of a UI element uses a Scale-Invariant Feature Transform (SIFT) routine from the Open Source Computer Vision Library (OpenCV). The SIFT routine can be used to identify features in an image. In other examples, other types of feature identification techniques can be employed.

The interactive area identification engine 106 determines (at 212) if an area of changed pixels exist. In other words, the interactive area identification engine 106 makes a determination of whether there is an area of pixels in the first set of video frames that changed state with respect to the same area of pixels in the second set of video frames.

If it is determined that the area of changed pixels exist, then the interactive area identification engine 106 determines (at 214) a contour of an interactive area that corresponds to a UI element. This determination of the contour can use various routines of the OpenCV Library.

For example, the interactive area identification engine 106 can use OpenCV Morphological Transformations routines of the OpenCV library to remove noise. For example, the OpenCV Morphological Transformations routines include an Erosion routine to erode boundaries of an object to remove white noise. As another example, the OpenCV Morphological Transformations routines include a Dilation routine (which can be performed before or after the Erosion routine) to increase a white region in an image, for noise removal.

If the result of a Morphological Transformations routine is not empty, then the interactive area identification engine 106 can attempt to abstract contours of an area corresponding to a UI element with an OpenCV Contours routine, referred to as findContours. The findContours routine can perform curve joining of continuous points (along a boundary), which have the same color or intensity. The identified contours can be used for detecting a UI element in the selected range of video frames (as selected at 206).

If a contour is detected, the interactive area identification engine 106 chooses an appropriately sized area defined by the contour. If a contour is not detected, then the interactive area identification engine 106 calculates a convex hull, such as the ConvexHull routine from SciPy.org. A convex hull for a set of points (which in this case is the set of pixels of an area corresponding to a user action event) in a Euclidean plane refers to a smallest convex set that contains the set of points. This convex hull corresponds to a contour around a UI element.

Once the contour is determined, the interactive area identification engine 106 saves (at 216) the area under the contour—this saved area is the area of corresponding to a UI element.

Although various example routines are used to perform various tasks associated with determining a contour, it is noted that other techniques can be used in other examples.

If the interactive area identification engine 106 determines (at 212) that an area of changed pixels does not exist, then the interactive area identification engine 106 performs segmentation (at 218) of the selected range of video frames (as selected at 206), such as by using the OpenCV Watershed routine. The segmentation finds multiple segments in the selected range of video frames.

The interactive area identification engine 106 selects (at 220) a range of segments (from the multiple segments) at the location of the event corresponding to a user action. The range of segments can include one segment, or multiple segments. The area containing the selected range of segments is then saved (at 222).

The interactive area identification engine 106 produces (at 224) a test object that includes the saved area (saved at 214 or 220). Note that the saved area includes a UI element selected by a user action. The test object is a UI element test object that represents a respective UI element that is to be used during a replay.

In alternative examples, a classifier, such as a deep learning neural network classifier, can be used to identify areas containing UI elements such as menu, toolbar, scrollbar, and other UI elements. The classifier can be trained to recognize certain types of UI elements in the video frames. The areas containing UI elements identified by the classifier can be included in UI element test objects.

The interactive area identification engine 106 then iterates (at 226) through other events represented by the event data 114, to find other interactive areas in the video frames 120 and to identify respective UI test objects.

The interactive area identification engine 106 also selects (at 228) a collection of video frames within a time interval in which user action events did not occur. In other words, during this time interval, a user did not make any user selections with respect to UI elements of the GUI 108.

The interactive area identification engine 106 identifies (at 230) area(s) in the collection of video frames that changed, even in the absence of user action events. Such area(s) that changed are likely dynamically changing areas (e.g., advertisement banners, background regions with changing graphics, etc.), which are not associated with user interactive areas. Such identified areas are marked (at 232) by the interactive area identification engine 106 as ignore areas such that the ignore areas are not selected as areas corresponding to UI elements.

The interactive area identification engine 106 also identifies (at 234) before event identification objects and end event identification objects. A before event identification object represents a state of a UI element before a user action event occurred, and an end event identification object represents a UI element after a user action event occurred. The identified before event identification objects and end event identification objects can be used during replay by the replay engine 130 to determine whether or not a user action successfully triggered a UI element.

The UI element test objects, event data correlated to the UI element test objects, identified features of UI elements, before event identification objects, and end event identification objects are provided (at 236) by the interactive area identification engine 106 to the test script generator 126. The test script generator 126 generates (at 238) the test script 128 based on the received data from the interactive area identification engine 106.

The replay engine 130 executes (at 240) the test script 128 to replay a collection of user actions that led to detected issue(s) of the program under test 104. During the replay, the video stream of the program under test 104 can be transferred to the replay engine 130. Note that for certain programs, such as a game application or a 3D simulation application, background areas of the GUI 108 may change that are not responsive to user selections of UI elements. The transferred video frames can be used by the replay engine 130 to reproduce such changing areas.

In other examples, the video stream can be replaced with a set of snapshot images. The snapshot frequency of the images is controlled by the replay engine 130 based on the frequency specified in the test script 128. This frequency can be statically set, or can be user-customizable.

The replay engine 130 uses the current GUI screen of the program under test 104 to try to locate the before event identification objects with a template match algorithm, such as the OpenCV Template Matching routine. The Template Matching routine attempts to find areas in the current GUI screen that matches a template, which in this example is in the form of a before event identification object. The output of the template matching includes areas that potentially are areas corresponding to UI elements. The replay engine 130 can use ignore areas marked (at 232) to determine which of the area output by the template matching are not UI element areas. Additionally, the replay engine 130 can use the OpenCV SIFT routine to abstract features of UI element area(s).

The identified features and information in the test script 128 can be sent to a classifier, such as a Support Vector Machine (SVM) classifier, to determine appropriate times to simulate user actions reflected in the test script 128. For example, actual use of the program under test 104, a user clicked a button in a pop-up dialog box. The dialog box is an example of a before event identification object. The appropriate time to simulate a user action based on the test script 128 is to wait for display of the dialog box. The classifier may be trained to recognize when pop-up dialog box or other UI elements are displayed to set the timing for user actions with respect to UI elements during replay. At the appropriate time, a user action specified by the test script 128 is used to activate the respective UI element. After the user action event is triggered, the replay engine 130 monitors the state of the GUI 108 of the program under test with respect to the UI element. The replay engine 130 compares the state of the GUI 108 to a corresponding end event identification object (identified at 234) to ensure the simulated user action successfully triggered the corresponding UI element.

Figure 3:
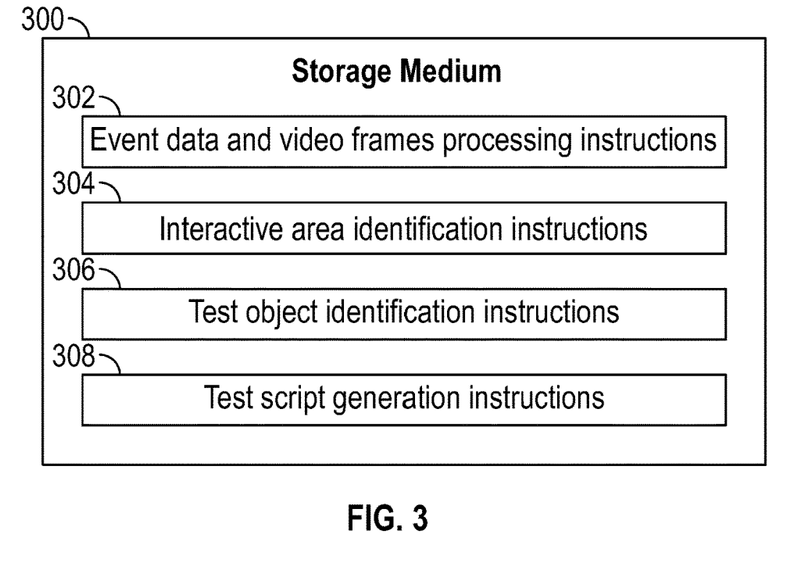
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include event data and video frames processing instructions 302 to process event data and video frames produced by a program (e.g., 104) during execution of the program, the event data representing user actions with respect to a GUI of the program.

The machine-readable instructions further include interactive area identification instructions 304 to identify an area of the GUI that corresponds to a respective user action, where identifying the area of the GUI uses a first video frame before an event corresponding to the respective user action, and a second video frame after the event corresponding to the respective user action.

The machine-readable instructions further include test object identification instructions 306 to identify, based on the identified area, a test object representing a UI element. The machine-readable instructions further include test script generation instructions 308 to generate a test script for testing the program, the test script including the test object.

Figure 4:
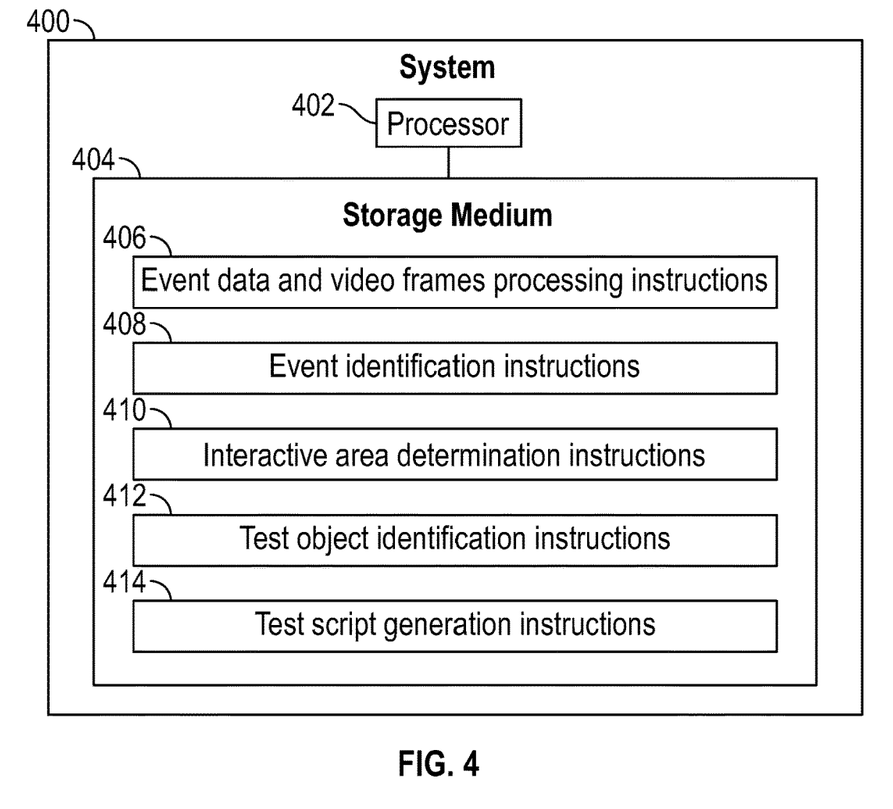
FIG. 4 is a block diagram of a system according to some examples.

FIG. 4 is a block diagram of a system 400 that includes a hardware processor (or multiple hardware processors) 402. A hardware processor can include a microprocessor, a core of a multi-core microprocessor, a microcontroller, a programmable integrated circuit, a programmable gate array, a digital signal processor, or another hardware processing circuit.

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include event data and video frames processing instructions 406 to process event data and video frames produced by a program during execution of the program, the event data representing user actions with respect to a GUI of the program. The machine-readable instructions include event identification instructions 408 to identify a first set of video frames before an event representing a respective user action of the user actions, and identify a second set of video frames after the event.

The machine-readable instructions include interactive area determination instructions 410 to determine using the first set of video frames and the second set of video frames an area of the GUI that corresponds to the respective user action.

The machine-readable instructions include test object identification instructions 412 to identify, based on the determined area, a test object representing a UI element. The machine-readable instructions further include test script generation instructions 414 to generate a test script for testing the program, the test script including the test object.

Figure 5:
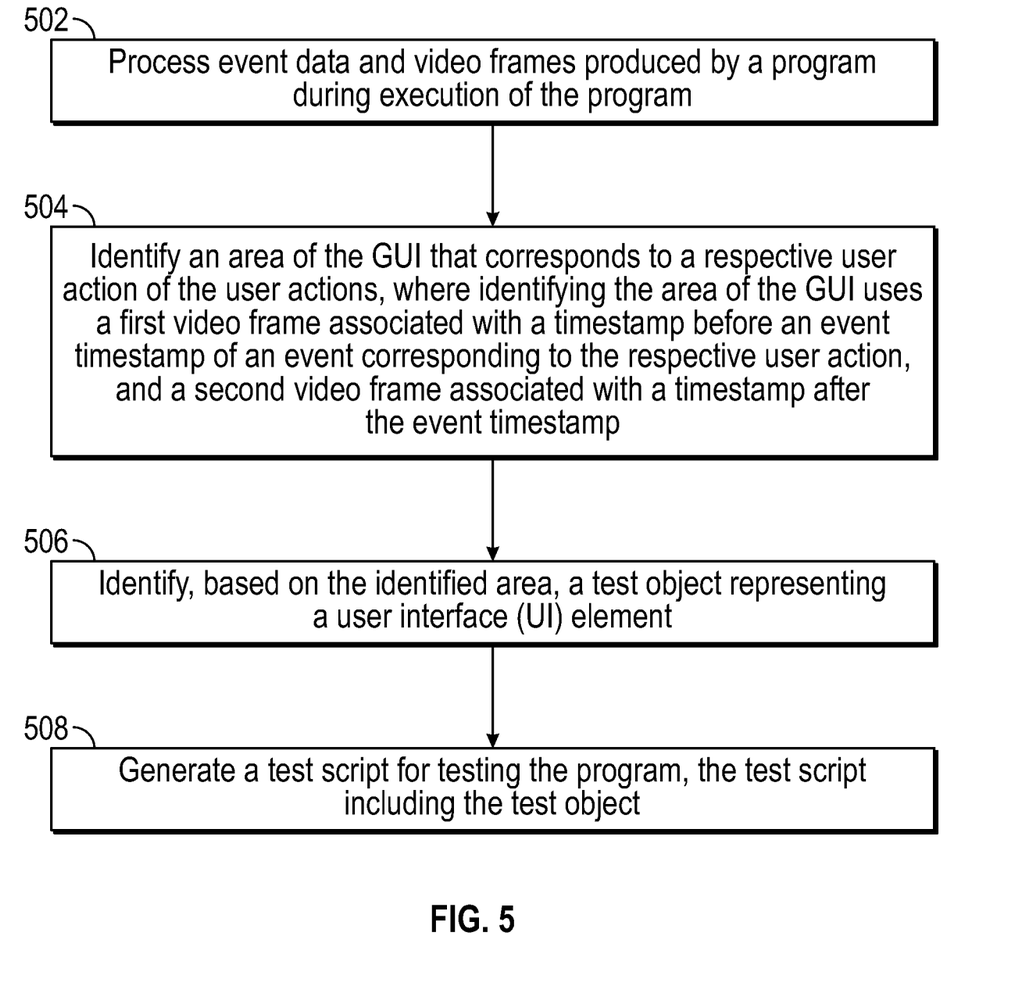
FIG. 5 is a block diagram of a process applied to further examples.

FIG. 5 is a flow diagram of a process according to some examples.

The process of FIG. 5 includes processing (at 502) event data and video frames produced by a program during execution of the program, the event data representing user actions with respect to a GUI of the program, the event data and the video frames associated with respective timestamps.

The process of FIG. 5 includes identifying (at 504) an area of the GUI that corresponds to a respective user action of the user actions, where identifying the area of the GUI uses a first video frame associated with a timestamp before an event timestamp of an event corresponding to the respective user action, and a second video frame associated with a timestamp after the event timestamp.

The process of FIG. 5 includes identifying (at 506), based on the identified area, a test object representing a UI element. The process of FIG. 5 includes generating (at 508) a test script for testing the program, the test script including the test object.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   process event data and video frames produced by a program during execution of the program, the event data representing user actions with respect to a graphical user interface (GUI) of the program, and wherein the user actions are received as an input to an input device;
   identify an area of the GUI that corresponds to a respective user action of the user actions, wherein identifying the area of the GUI uses a first video frame before an event corresponding to the respective user action, and a second video frame after the event corresponding to the respective user action;
   identify, based on the identified area of the GUI, a test object representing a user interface (UI) element;
   generate a test script for testing the program, the test script including the test object;
   analyze video frames that occurred between events corresponding to user actions to identify regions of the GUI that change; and
   mark the identified regions of the GUI as not related to user actions.

2. The non-transitory machine-readable storage medium of claim 1, wherein the event data and the video frames are associated with timestamps, wherein the first video frame is associated with a first timestamp before an event timestamp associated with the event, and the second video frame is associated with a second timestamp after the event timestamp associated with the event.

3. The non-transitory machine-readable storage medium of claim 2, wherein identifying the area of the GUI that corresponds to the respective user action uses a first set of video frames before the event timestamp, and a second set of video frames after the event timestamp.

4. The non-transitory machine-readable storage medium of claim 1, wherein identifying the area of the GUI that corresponds to the respective user action is based on identifying a set of pixels that changed from a first state in the first video frame to a different second state in the second video frame.

5. The non-transitory machine-readable storage medium of claim 4, wherein the set of pixels corresponds to a region of the GUI selected by the respective user action.

6. The non-transitory machine-readable storage medium of claim 4, wherein identifying the area of the GUI that corresponds to the respective user action comprises identifying a contour around the set of pixels.

7. The non-transitory machine-readable storage medium of claim 1, wherein identifying the area of the GUI that corresponds to the respective user action comprises segmenting an image of the GUI to find features associated with the UI element.

8. The non-transitory machine-readable storage medium of claim 1, wherein the instructions upon execution cause the system to:
   save features of the GUI in the first video frame prior to occurrence of event corresponding to the respective user action.

9. The non-transitory machine-readable storage medium of claim 1, wherein the instructions upon execution cause the system to:
   determine a time at which the respective user action is to be performed; and
   trigger the respective user action at the determined time during replay of the test script.

10. The non-transitory machine-readable storage medium of claim 1, wherein the instructions upon execution cause the system to:
    during replay of the test script to test the program, locate an interactive area of the GUI of the program based on matching the test object in the test script to a template.

11. The non-transitory machine-readable storage medium of claim 1, wherein the instructions upon execution cause the system to:
    use a machine learning classifier to identify the area.

12. The non-transitory machine-readable storage medium of claim 1, wherein the event data is associated with event timestamps, and the video frames are associated with video timestamps, and wherein the instructions upon execution cause the system to:
    correlate events represented by the event data to areas containing UI elements based on the event timestamps and the video timestamps.

13. A system comprising:
    a processor; and
    a non-transitory machine-readable storage medium storing instructions executable on the processor to:
    process event data and video frames produced by a program during execution of the program, the event data representing user actions with respect to a graphical user interface (GUI) of the program, and wherein the user actions are received as an input to an input device;

identify a first set of video frames before an event representing a respective user action of the user actions, and identify a second set of video frames after the event;

determine, using the first set of video frames and the second set of video frames, an area of the GUI that corresponds to the respective user action;

identify, based on the determined area of the GUI, a test object representing a user interface (UI) element;

generate a test script for testing the program, the test script including the test object;

analyze video frames that occurred between events corresponding to user actions to identify regions of the GUI that change; and mark the identified regions of the GUI as not related to user actions.

14. The system of claim 13, wherein the processing of the event data and video frames, the identifying of a first and second sets of video frames, the determining of the area of the GUI, the identifying of the test object, and the generating of the test script are performed as part of real-time processing of the event data and the video frames to generate the test script.

15. The system of claim 14, wherein determining the area of the GUI that corresponds to the respective user action is based on identifying a set of pixels that changed from a first state in the first set of video frames to a different second state in the second set of video frames.

16. The system of claim 15, wherein determining the area of the GUI that corresponds to the respective user action comprises identifying a contour around the set of pixels.

17. The system of claim 13, wherein the determining of the area of the GUI that corresponds to the respective user action comprises segmenting video frames of the GUI to find features associated with the UI element.

18. A method performed by a system comprising a hardware processor, comprising:

processing event data and video frames produced by a program during execution of the program, the event data representing user actions with respect to a graphical user interface (GUI) of the program, the event data and the video frames associated with respective timestamps, and wherein the user actions are received as an input to an input device;

identifying an area of the GUI that corresponds to a respective user action of the user actions, wherein identifying the area of the GUI uses a first video frame associated with a timestamp before an event timestamp of an event corresponding to the respective user action, and a second video frame associated with a timestamp after the event timestamp;

identifying, based on the identified area of the GUI, a test object representing a user interface (UI) element;

generating a test script for testing the program, the test script including the test object analyzing video frames that occurred between events corresponding to user actions to identify regions of the GUI that change; and marking the identified regions of the GUI as not related to user actions.

19. The method of claim 18, further comprising:

replaying the test script to test the program, wherein the replaying locates an interactive area of the GUI of the program by matching the test object to a template.

20. The method of claim 19, wherein identifying the area further comprises executing a machine learning classifier to identify the area.

* * * * *